Aug. 22, 1961   G. L. NYBORG   2,997,573
ILLUMINATED WARNING MEANS
Filed Oct. 17, 1956
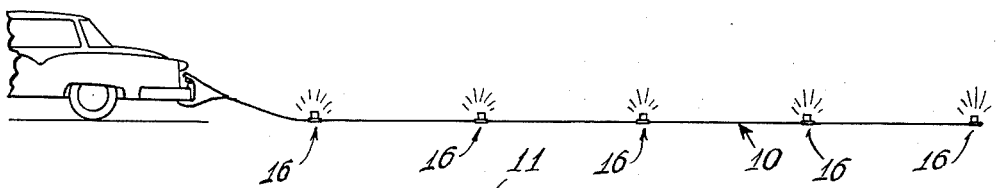
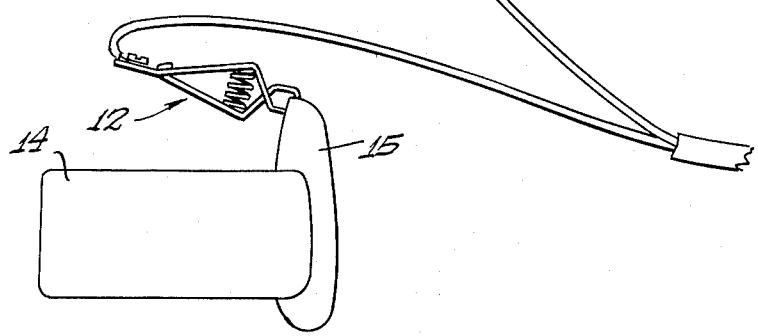
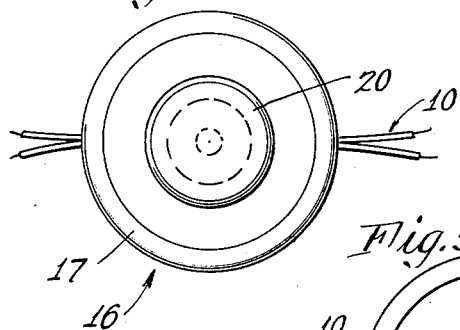
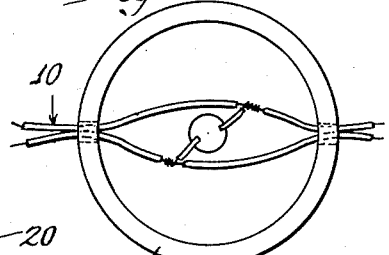
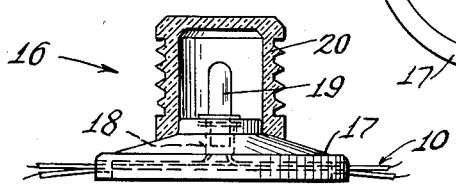
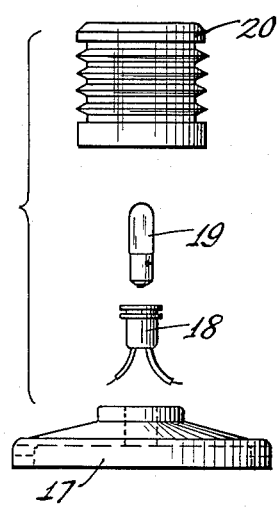
INVENTOR.
George L. Nyborg
BY
Munn, Liddy, Nathanson & March
ATTORNEYS United States Patent Office 2,997,573
Patented Aug. 22, 1961

2,997,573
ILLUMINATED WARNING MEANS
George L. Nyborg, 15 5th Ave., Pelham, N.Y.
Filed Oct. 17, 1956, Ser. No. 616,522
2 Claims. (Cl. 240—8.18)

This invention relates to warning devices, and more particularly to electrical illuminating means for warning oncoming vehicles of a dangerous condition in the road ahead, which will require their slowing down and using caution.

In the past various devices have been proposed to effect a warning that a vehicle is disabled or in distress along a highway. Flares have been used, flashing electric signal lamps, lanterns, flashlights and the like. However, with the advent of the higher permissible speeds on expressways, parkways, thruways and the like, it has become increasingly apparent that these prior devices did not provide an adequate signal in sufficient time.

The disadvantages and deficiencies of prior warning devices of the above type are obviated by the present invention, and one object of the invention is to provide a novel and improved, electrically-illuminated warning means by which a timely and adequate signal is given to vehicles approaching at high speeds, thereby to give the drivers of such vehicles sufficient time to slow down and approach with caution, so as to avoid accident or catastrophe.

A further object of the invention is to provide an improved signal or warning means as above characterized, which may be easily and quickly set in place and made operative, all without special equipment and without requiring skill, thus adapting the signal to use by all types of drivers.

Yet another object of the invention is to provide an improved warning means of the above type, which is extremely simple in its construction and employs relatively few components of simple design, whereby the device may be economically fabricated and manufactured.

A feature of the invention resides in the provision of an improved signal or warning means in accordance with the above, which is extremely reliable in its operation at all times.

Another and important feature of the invention resides in the provision of an improved warning device which will attract the attention of the drivers of rapidly approaching vehicles in good and sufficient time, said device being so constituted and characterized as to extend along an appreciable and relatively large distance of the travelled way, and yet being collapsible to a relatively small package or bundle when this is necessary for storage.

Other features and advantages will hereinafter appear.

In the drawings accompanying this specification, similar characters of reference indicate corresponding parts wherever possible in the several views, in which:

FIGURE 1 is a broadside elevational view of the improved warning device of this invention in extended and operative position, connected to a vehicle to receive energy therefrom.

FIG. 2 is a detail illustrating the connector means secured to one end of the current-carrying line of the device.

FIG. 3 is a top plan view of one of the lamp fixtures constituting a portion of the warning means as provided by the invention.

FIG. 4 is a side view of the fixture showing in FIG. 3, said fixture being illustrated partly in elevation and partly in vertical section.

FIG. 5 is a bottom view of the fixture of FIGS. 3 and 4.

FIG. 6 is an exploded view of the fixture.

Referring to FIG. 1, the improved, electrically illuminated alarm or signal means of this invention is shown as comprising an elongate, current-carrying line 10 of appreciable length, preferably on the order of 50 feet or upwards thereof. The line 10 may be constituted of any suitable multiple conductor cable or equivalent. For example, it may be formed of a ribbon-like cable, or a coaxial cable, or a twisted two-conductor or multiple conductor cable as desired.

At one end the cable or line 10 has secured to it means by which it may be connected to a source of current. Such means is illustrated in FIG. 2 as comprising a pair of spring-biased clips 11 and 12 individually joined to two conductors of the line 10. The clip 11 is preferably of the type having an insulation-penetrating prong or tine 13 by which the conductor of an insulated wire or cable may be contacted or tapped to provide a source of voltage for the alarm device. The clip 12 may be of any suitable type adapted to clamp onto a ground member of an automobile or other structure, or source of current supply.

In FIG. 2 there is shown an automobile bumper 14 and bumperette 15, to which the clip 12 may be easily and conveniently attached.

In accordance with this invention there is provided on the line 10, at spaced intervals therealong, a plurality of lamp fixtures 16, arranged to receive current from the line. As shown in FIGS. 3–6, each of the lamp fixtures 16 may be advantageously constituted of a broad flat base 17 mounting a socket 18 in which an incandescent bulb or other illuminating means 19 may be disposed. The base 17 carries a transparent or translucent dome 20 adapted to encompass or protect the bulb 19. The underside of the base 17 is recessed, and the conductors of the line 10 pass into such recess, as shown in FIG. 5, such conductors being connected with the terminals of the socket 18. It is preferred that the recesses in the bases 17 be filled with a suitable rubber, plastic or equivalent sealing compound, by which moisture, dirt and the like is shut out from the base and from the electrical connections which have been made therein.

Further, in accordance with this invention, the lamp fixtures 16 or the lamps 19 thereof are provided with flashing devices by which each lamp continually flashes, thereby to more effectively attract the attention of the drivers of on-coming vehicles.

Referring again to FIG. 1, I propose to extend the line 10 with the lamp fixtures 16 carried thereby, along the travelled way whenever the vehicle equipped with the signal becomes stalled, or when it is necessary for other purposes to halt such vehicle. The line 10 may be strung out from the rear of the vehicle, as illustrated, and may be extended for an appreciable distance, as for example 50 feet or more, and this is an important feature of the invention.

By constructing the line 10 so as to have a very appreciable length, it will also extend around curves, and with the plurality of flashing lamps will constitute an effective and reliable signal and warning means by which the drivers of fast approaching vehicles will be given a timely warning, enabling them to bring their vehicles to a complete stop if this should be necessary.

Where, as heretofore proposed, only one illuminated signal is provided, it is often possible for an approaching driver to mistake the intent of the signal, or to miss seeing the same due to an obstruction in the view. However, where a relatively large number of flashing signals is provided, extending for an appreciable distance along the travelled way, it is extremely unlikely for the signalling means to escape the notice of an approaching driver, and extremely unlikely for such a driver to mistake the importance or significance of such signalling means.

It will therefore be readily appreciated that, by the above construction, I have provided an extremely effective and reliable safety device in the form of a signal or warning means, by which accidents will be prevented at night time in the event that a vehicle becomes stalled along the driven way.

Variations and modifications may be made within the scope of the claims, and portions of the improvements may be used without others.

I claim:

1. An outside signal lamp adapted to be placed on the ground along the side of a road, comprising a relatively wide, low and flat, stable base in the form of an inverted dish, said base having downwardly extending side walls and an upstanding hollow central boss on its top surface, and having a large shallow recess in its underside; an electric lamp receptacle carried by said hollow base and disposed inside of the said central boss; electric lines passing through the side walls of the base and into and out of the said shallow recess, said lines being connected with the receptacle to supply energy thereto; a sealing compound disposed in and permeating said recess, and covering over and surrounding completely the electric lines within the recess, said compound being flush with the bottom edges of the base and being adapted to keep out water, dirt and foreign matter from the recess; and a transparent, cup-shaped inverted dome mounted on said base and having a bottom lip extending around the outside of and snugly fitting and sealing against the boss of the base to protect a bulb placed in the receptacle and to keep out foreign matter, said dome being removable to permit replacement of the bulb, the upper surface of said base which is disposed outwardly of the lip of the dome being imperforate to keep out the weather and the top surface of the boss extending from the lip of the dome inward to the said receptacle.

2. The invention as defined in claim 1, in which the base is of circular configuration and has a substantially conical top surface extending from its periphery to the said central boss.

References Cited in the file of this patent

UNITED STATES PATENTS

| | | |
|---|---|---|
| 1,221,524 | Frankel | Apr. 3, 1917 |
| 1,635,372 | Lippert | Jan. 12, 1927 |
| 1,753,117 | Hosking | Apr. 1, 1930 |
| 2,165,562 | Mack et al. | July 11, 1939 |
| 2,296,151 | Dover | Sept. 15, 1942 |
| 2,597,705 | Clines | May 20, 1952 |
| 2,638,576 | O'Brien | May 12, 1953 |
| 2,671,212 | Mingle | Mar. 2, 1954 |